May 13, 1958  A. R. BRUNELLE  2,834,107
TOOL FOR PRUNING GROWTH ON TOBACCO PLANTS
Filed June 19, 1957
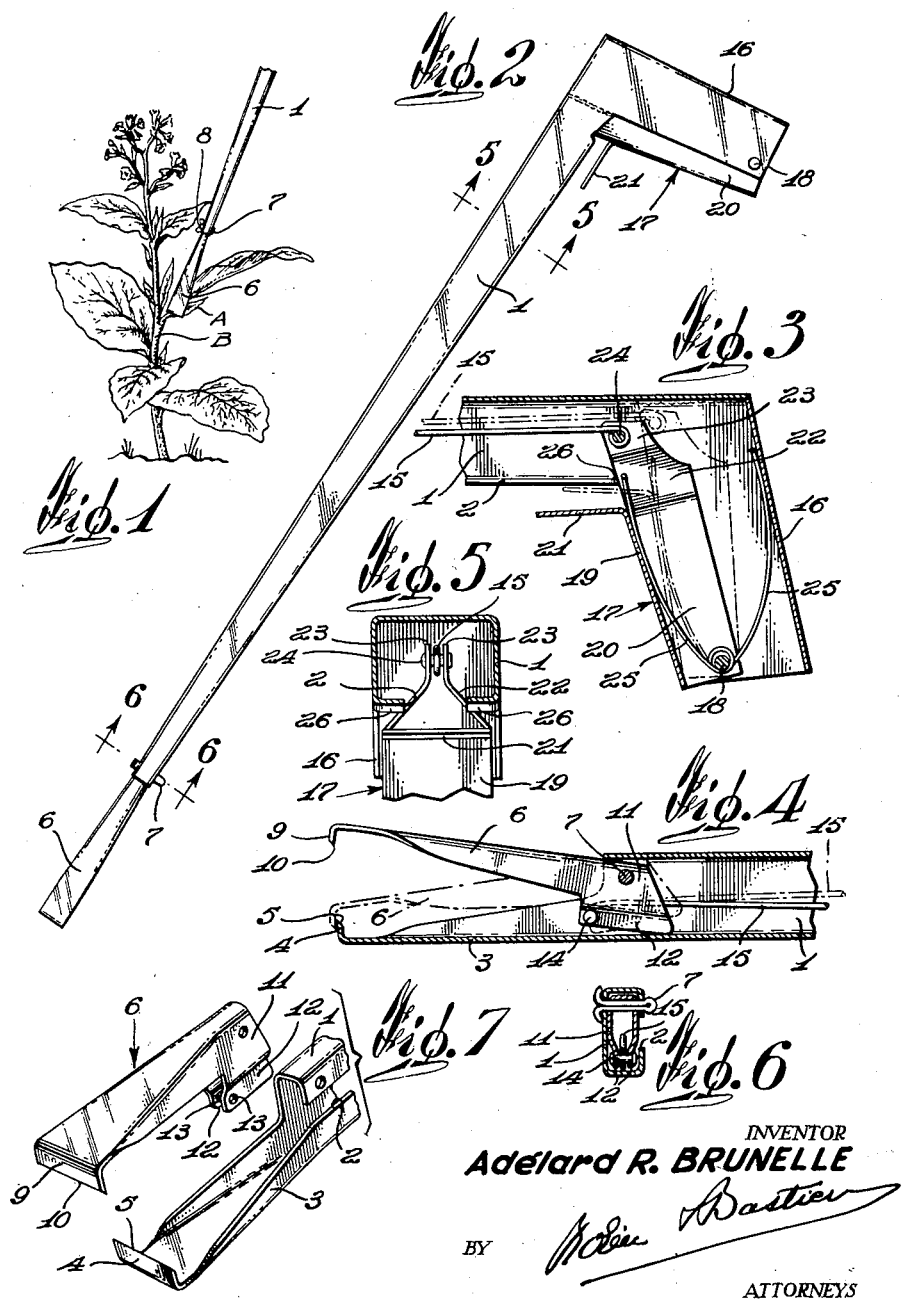
INVENTOR
Adélard R. BRUNELLE
BY
ATTORNEYS United States Patent Office 2,834,107
Patented May 13, 1958

2,834,107
TOOL FOR PRUNING GROWTH ON TOBACCO PLANTS

Adelard R. Brunelle, Batiscan, Quebec, Canada

Application June 19, 1957, Serial No. 666,676

2 Claims. (Cl. 30—251)

The present invention relates to a tool to be used on farms for pruning plants and, more particularly, for pruning growth on tobacco plants such as small leaves on the plant stem.

It is known that tobacco plants have to be pruned several times during the growing season in order to obtain a high yield with leaves of good quality.

The conventional method of pruning tobacco plants is by stooping down over the plant and using the hand to twist and pull the undergrowth off the stem of the plant. Gloves have to worn in this conventional method because the nicotine and acid character of tobacco plants may cause burns to the bare hand.

Accordingly, the general object of the present invention is the provision of a tool which will considerably facilitate the pruning of tobacco plants and will enable the operator to carry out said operation while standing upright resulting in a faster operation and, because it is not necessary to touch the plant with the hands, gloves do not have to be worn.

Another important object of the present invention is the provision of a tool of the character in which the cutting blades operate in a plane at right-angles to the tool handle, whereby the growth on the stem of the tobacco plant may be pruned by using the tool in a position which will be the least tiring for the operator.

Yet another important object of the present invention is the provision of a tool for pruning growth on tobacco plants which is of light-weight construction, therefore being easily manipulated, and in which the cutting blades are designed in such a manner as to prevent damage to the larger tobacco leaves eventually to be harvested.

Another object of the present invention is the provision in a tool of the character described of means to prevent rubbing and friction of the operator's hand against stationary parts of the tool.

The foregoing and other important objects of the present invention will become more apparent during the following disclosure and by referring to the drawings in which:

Figure 1 is a perspective view of a tobacco plant showing how the tool in accordance with the present invention is used;

Figure 2 is a side view of the tool;

Figure 3 is a longitudinal section of the handle part of the tool;

Figure 4 is a longitudinal section of the blade part of the tool;

Figure 5 is a cross-section along line 5—5 of Figure 2;

Figure 6 is a cross-section of the long line 6—6 of Figure 2; and

Figure 7 is an exploded perspective view of the cutting blades or claws.

Referring now more particularly to the drawings in which like reference characters indicate like elements throughout, the tool comprises an elongated tubular body 1, preferably made of sheet metal, tapering from one end to the other. The sheet metal material constituting the body 1 is preferably bent to have a substantially rectangular cross-section such that the body 1 is closed on three sides, but is open on the fourth inner side longitudinally along the whole length of the body 1 to define a longitudinal slot 2.

The smaller end of the body 1 is extended by a stationary blade or claw member 3 which has a U-shaped cross-section, gradually increasing in width towards its outer end, and has an outer portion inwardly bent to provide a blade 4, which has bevelled edge 5.

A movable claw member 6 is hinged on the smaller end of the tubular body 1 by means of a cotter pin 7 for pivotal movement towards and away from the stationary claw member 3. The claw member 6 has substantially the same shape as the claw member 3, having a U-shaped cross-section and increasing in width towards its outer end, which is bent inwardly to provide a blade 9 having a bevelled edge 10.

In the closed position of the claw member 6, its cutting edge 10 overlaps the cutting edge 5 of the claw 3, as shown in dot and dash line in Figure 4. The pivoted portion 11 of the claw member 6 is adapted to fit within the smaller end of the body 1, as shown in Figure 4, and said portion 11 is provided with closely spaced ears 12 having registering holes 13 for insertion of a pin 14 to attach an actuating rod 15. The end of the rod 15 is looped around the pin 14 for secure attachment and said rod extends longitudinally through the tubular body 1.

The larger end of the body 1 is provided with an integral handle 16 which extends at an angle laterally of the body 1 and in a plane at right-angles to the plane in which the claw member 6 pivots between its open and closed positions.

The handle 16 is made of sheet metal and has a U-shaped cross-section providing a full width opening facing the body 1. An operating member 17, also made of sheet metal and having a U-shaped cross-section, is inserted within the open portion of the handle 16 and has its outer end pivoted within the handle 16 at the outer end thereof by means of a rivet or cotter pin 18.

The transverse portion 19 of the operating member 17 faces outwardly of the handle 16 and provides the grip for the hand of the operator, while a part of said transverse portion is cut out from the side flanges 20 at the end of the operating member 17 opposite the pivot pin 18 and is bent outwardly to form a guard 21 adapted to protect the operator's hand against friction with the body 1 during pivotal movement of said operating member 17.

The end portions of the side flanges 20 opposite the pivot pin 18 and projecting from the guard 21 are bent towards each other, as shown at 22 in Figure 5, to provide closely spaced substantially parallel flanges 23 to which the end of the rod 15 is attached by being looped around a transverse pin 24 passing through said flanges 23.

A spring wire 25 is disposed within the handle 16 and operating member 17, having one leg abutting against the bottom of the handle 16 and the other leg abutting against the bottom of the operating member 17 and its intermediate portion looped on the pivot pin 18.

The spring wire 25 serves to urge the operating member 17 outwardly of the handle 16 and thereby to push the rod 15 towards the smaller end of the body 1, which in turn causes opening movement of the claw 6. The spring wire 25 can be replaced, in a modified arrangement (not shown), by a spring wire looped around pivot pin 7 and having its legs abutting against the inside faces of claw member 6 and body 1 and stressed to cause opening movement of claw member 6. The opening movement of the claw 6 is limited by having the portions 22 of the side flanges 20 of the operating member 17 abut against shoulders 26 formed by cut-out portions of the flanges of the body 1 delimiting the slot 2.

The tool, in accordance with the present invention, is grasped by one hand, with the handle 16 in a substantially vertical plane so that the claw members 3 and 6 will operate in a transverse palne to engage the sides of a small leaf A near the stem B of the tobacco plant. Thus the growth A can be easily cut by simply squeezing the operating member 17. It will be noted that the claw members 3 and 6 provide open sides whereby the small leaf or growth A may extend therethrough when engaged by the claw members 3 and 6; thus the part of the small leaf or growth A close to the plant stem B can be easily reached and cut by the cutting edges 5 and 10.

The tool, in accordance with the present invention, is easily made and assembled. In the assembly of the various parts, the attachment of the rod 15 to the pivoted claw member 6 and to the operating member 17 is facilitated by the slot 2 made in the body 1: said rod 15 may be inserted through the slot 2 and bent around the pivot pins 14 and 24 by means of a suitable pair of pliers inserted through the slot 2.

While a preferred embodiment according to the present invention has been illustrated and described, it is understood that various modifications may be resorted to without departing from the scope of the appended claims.

I claim:

1. A tool for pruning growth on tobacco plants comprising a hollow tubular body of elongated shape and tapering from one end to the other, an integral handle depending from the larger end of said body, said handle having a U-shaped cross-section with its open side directed towards said body, an operating member of U-shaped cross-section inserted within the open side of said handle and pivoted thereto at the outer end of said handle, said operating member having a guard member projecting outwardly therefrom and extending close to said body, resilient means to urge said operating member outwardly of said handle, abutment shoulders on said body engageable with the outer end of said operating member to limit the outward pivotal movement thereof with respect to said handle, the smaller end of said tubular body having an integral extension forming a first claw member of substantially U-shaped cross-section terminated by an inturned lip having a bevelled cutting edge, said second claw member pivoted for movement of its cutting edge towards and away from the cutting edge of said first claw member, and a rod connecting said second claw member to said operating member whereby squeezing of said operating member will cause closing movement of said pivoted claw member in respect to said stationary claw member.

2. A tool as claimed in claim 1, wherein said pivoted claw member pivots in a plane at right-angles to the plane containing said body and handle.

References Cited in the file of this patent

UNITED STATES PATENTS

| | | |
|---|---|---|
| 173,977 | Lyman | Feb. 22, 1876 |
| 842,420 | Petty | Jan. 29, 1907 |
| 928,335 | Ryden | July 20, 1909 |
| 1,333,578 | Ruppert | Mar. 9, 1920 |
| 1,561,501 | Albright | Nov. 17, 1925 |
| 1,971,611 | Hill | Aug. 28, 1934 |
| 2,055,270 | Villard et al. | Sept. 22, 1936 |